(12) United States Patent
Girkar et al.

(10) Patent No.: US 6,378,043 B1
(45) Date of Patent: Apr. 23, 2002

(54) REWARD BASED CACHE MANAGEMENT

(75) Inventors: Mahesh Girkar; Prabuddha Biswas; Ashok Joshi, all of Nashua, NH (US)

(73) Assignee: Oracle Corporation, Redwood Shores, CA (US)

(*) Notice: Subject to any disclaimer, the term of this patent is extended or adjusted under 35 U.S.C. 154(b) by 0 days.

(21) Appl. No.: 09/224,381

(22) Filed: Dec. 31, 1998

(51) Int. Cl.$^7$ ............................................... G06F 12/12
(52) U.S. Cl. ........................ 711/133; 711/134; 711/136; 711/159
(58) Field of Search .................................. 711/133, 134, 711/136, 159, 160, 125, 113; 341/63

(56) References Cited

U.S. PATENT DOCUMENTS

| | | | | |
|---|---|---|---|---|
| 5,394,531 A | * | 2/1995 | Smith | 711/136 |
| 5,432,919 A | * | 7/1995 | Falcone et al. | 711/134 |
| 5,511,178 A | * | 4/1996 | Takeda et al. | 711/125 |
| 5,590,308 A | * | 12/1996 | Shih | 711/136 |
| 5,619,675 A | * | 4/1997 | Martine et al. | 711/133 |
| 5,689,255 A | * | 11/1997 | Frazier et al. | 341/63 |
| 5,778,442 A | * | 7/1998 | Ezzat et al. | 711/159 |
| 5,845,318 A | * | 12/1998 | Rose et al. | 711/113 |

* cited by examiner

Primary Examiner—Matthew Kim
Assistant Examiner—B. R. Peugh
(74) Attorney, Agent, or Firm—Hickman Palermo Truong & Becker LLP; Marcel K. Bingham

(57) ABSTRACT

A method and apparatus for buffering is provided. A set of buffers is maintained in an ordered list based on a profit value generated for each buffer. The profit value for a buffer reflects multiple access characteristics of the buffer. The list of buffers is partitioned into divisions referred to as buckets. Each bucket contains a set of buffers and is associated with a subrange of the fall range of profit values that may be generated. The bucket that covers the very top of the list is associated with highest profit value subrange, the bucket that covers the bottom of the list is associated with the lowest profit value subrange. When data is first placed in a buffer, the buffer's position within the buffer list is not immediately based on its profit value. Instead, an access history is first accumulated for the buffer and, once accumulated, the buffer's profit value earns the buffer's place in the list. Specifically, after new data is added to a buffer, it is placed at the insertion point for the list. When the buffer is next accessed, it is placed at the top of list. As other buffers are added to the top of the list above the buffer, the buffer is pushed down the list. As the buffer is pushed down, its access history is updated, but its order within the list is left unchanged. When the buffer reaches a certain position within the list, the buffer's profit value dictates the buffer's place in the list.

24 Claims, 10 Drawing Sheets

| |
|---|
| Free Ride Flag 212 |
| Free Ride Relative Flag 213 |
| Touch Count 214 |
| Last Touch Time 216 |
| First Touch Time 218 |
| Next Buffer Pointer 220 |
| Previous Buffer Pointer 222 |
| Previously Touched Pointer 232 |
| Subsequently Touched Pointer 234 |
| Previously Added Pointer 242 |
| Subsequently Added Pointer 244 |

Buffer 114

FIG. 2

REWARD BASED CACHE MANAGEMENT

FIELD OF THE INVENTION

The present invention relates to buffering data in a computer system.

BACKGROUND OF THE INVENTION

A computer system has limited memory for storing data processed by the computer system. At any given time, the amount of data to be processed may exceed the amount that may be stored in volatile memory. To address this problem, buffering systems are used. Generally, buffering systems use an area of volatile memory to store a portion of the data to be processed. This area of memory is referred to as a cache. Whenever a computer system needs a subset of data, it retrieves the needed subset from the cache. If the cache does not hold the data, then the computer system retrieves the data from the storage area holding the needed data (e.g. a non-volatile storage device, or another area of volatile memory), then may store the retrieved data in the cache. Over time, the cache becomes fill. When the cache is full, and a computer system needs data that is not in the cache, the computer system replaces a subset of data currently residing in the cache with the needed data. If the replaced data has been changed while it resided in the cache, it is typically written to another storage area (e.g. non-volatile storage device) before it is replaced.

The process of replacing a subset of data in a cache with another subset of data from another storage area, and then storing the replaced subset of data in area other than the cache, is referred to as swapping. Excessive swapping can be expensive, especially for caches used to buffer data between disk storage and volatile memory.

To reduce swapping, many buffering approaches have been developed. Typically, the goal of these buffering approaches is to retain in cache data that will reduce swapping, and to replace data whose absence will least increase swapping. The degree to which a set of data tends to reduce swapping if retained in memory is referred to as the profit of the set of data.

Each buffering approach uses some measure to gauge profit. Measures of profit are typically based on access characteristics that reflect the history of access to a set of data. These historical access characteristics are used to estimate the degree to which the data is likely to be accessed in the near future. Data that has access characteristics that indicates that it will be the least likely to be accessed (i.e. low profit) is replaced from the cache, data with access characteristics that indicate that it will be the most likely to be accessed (i.e. high profit) is retained.

Conventional buffering approaches include the least recently used (LRU) approach, the least frequently used (LFU) approach, and the first-in first-out (FIFO) approach. The LRU approach replaces the least recently used data in the cache with new data. Thus, under the LRU approach, the data with the highest profit is the most recently used data. The LRU approach is based on "locality of reference," the tendency in computer programs to access within a period of time the same subsets of data. Thus, the data that was the most recently accessed is the data that will most likely be accessed in the near future.

The LFU approach replaces the least frequently used data. Thus, under the LFU approach, the data with the highest profit is the most frequently used data. The FIFO approach replaces the oldest data. Under the FIFO approach, the data with the highest profit is the newest data added to the cache.

A wide range of applications, especially in the operating system and database systems, use an ordered LRU list. A common LRU list implementation is an ordered linked list of buffers. The order of the list is important because it reflects the order in which the buffers are selected for replacement. The order is thus referred to as the replacement order. The replacement order reflects the profit of buffers relative to each other, as measured by recency of use. The buffer at the top of the list contains the most recently used data. The buffer at the bottom of the list contains the least recently used data. When a given buffer is accessed, the buffer is moved to the top of the list. When new data is brought into the cache, it replaces data in the buffer at the bottom of list (least recently used buffer). The buffer is then moved to the top of the list.

One disadvantage of the LRU approach is that a considerable amount of overhead is required to rearrange the list each time a buffer's data is accessed. Because of locality of reference, buffers at the top of list are the most likely to be accessed again in the near future. Consequently, many buffers at the top of the list do not progress very far toward the bottom before they are moved back to the top. Thus, much work is often wasted juggling buffers that remain near the top anyway.

Another disadvantage of the LRU approach is that it uses only one characteristic that indicates profit and ignores other highly relevant ones. As a result, a buffer which is in fact associated with the lowest profit among all buffers may be placed at top of the list. The replacement order thus inaccurately reflects the order of the true profit. For example, an LRU list contains buffers which are all being frequently accessed, except for a first buffer. When the first buffer is accessed, it is moved to the top of the list, above buffers which in fact have much higher profit.

A conventional buffering approach which does account for multiple characteristics that indicate profit is the buffering approach developed by Robinson and Murthy, herein referred to as the "Robinson approach". The Robinson approach is an extension of the LRU approach. Like the LRU approach, in the Robinson approach buffers are maintained in an ordered link list, and the most recently used buffers are moved to the top of the list. However, when selecting a buffer for replacement, Robinson measures profit by accounting for, in addition to recency of use, frequency of access. Specifically, for each buffer a touch count is maintained. The touch count reflects the number of times a buffer has been accessed. When a buffer is selected for replacement, a subset of the buffers at the bottom of the list are examined. The buffer with the lowest touch count in the subset is selected for replacement.

One disadvantage of the Robinson approach is that the order of the list of buffers does not actually reflect a measure of profit that accounts for both recency of use and frequency of use. The reason for this lack of accounting is that the Robinson measure of profit is inconsistently calculated. Frequency of access is considered only when selecting a replacement. However, when a buffer is accessed, it is moved to the top of the list regardless of its touch count. Moreover, while the buffer list could be reordered using a consistent measure of profit, such a reordering is an expensive operation, and may negate any gain.

Based on the foregoing, it is clearly desirable to provide a method for measuring profit that accounts for multiple characteristics relevant to profit, and that efficiently selects data for replacement based on a consistently applied measure of profit.

SUMMARY OF THE INVENTION

A method and apparatus for buffering data is described. According to an aspect of the present invention, a set of buffers is maintained in an ordered list based on a profit value generated for each buffer. The profit value for a buffer reflects multiple access characteristics of the buffer. The list of buffers is partitioned into divisions referred to as buckets. Each bucket contains a set of buffers and is associated with a subrange of the full range of profit values that may be generated. The bucket that covers the very top of the list is associated with highest profit value subrange, the bucket that covers the bottom of the list is associated with the lowest profit value subrange.

According to another aspect of the present invention, when data is first placed in a buffer, the buffer's position within the buffer list is not immediately based on its profit value. Instead, an access history is first accumulated for the buffer and, once accumulated, the buffer's profit value earns the buffer's place in the list. Specifically, after new data is added to a buffer, it is placed at the insertion point for the list. When the buffer is next accessed, it is placed at the top of list. As other buffers are added to the top of the list above the buffer, the buffer is pushed down the list. While the buffer is being pushed down the list, it is referenced, its access history is updated, but its order within the list is left unchanged, until the buffer crosses a certain position within the list. After the buffer crosses this position, the buffer's profit value dictates the buffer's place in the list.

According to another aspect of the present invention, a buffer's profit value is a function of multiple access characteristics. Specifically, one or more profit factors that each reflect one or more access characteristics are used to generate the profit values. Examples of profit factors include, but are not limited to, normalized values that reflect (1) a buffer's relative frequency of access (i.e. relative to other buffers in the cache), (2) a buffer's relative recency of access, (3) the relative tenure of data currently residing in a buffer, or (4) the relative frequency of access within a subset of accesses to any buffers in the cache. In calculating a profit value for a buffer, the profit factors may be accorded equal weight, or accorded weight by application of any desired function.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a block diagram depicting the structure of a buffer according to an embodiment of the present invention;

FIGS. 3A-1 and 3A-2 are flowcharts showing steps performed when replacing data in a buffer with new data according to an embodiment of the present invention;

DETAILED DESCRIPTION OF THE PREFERRED EMBODIMENT

Figure 1:
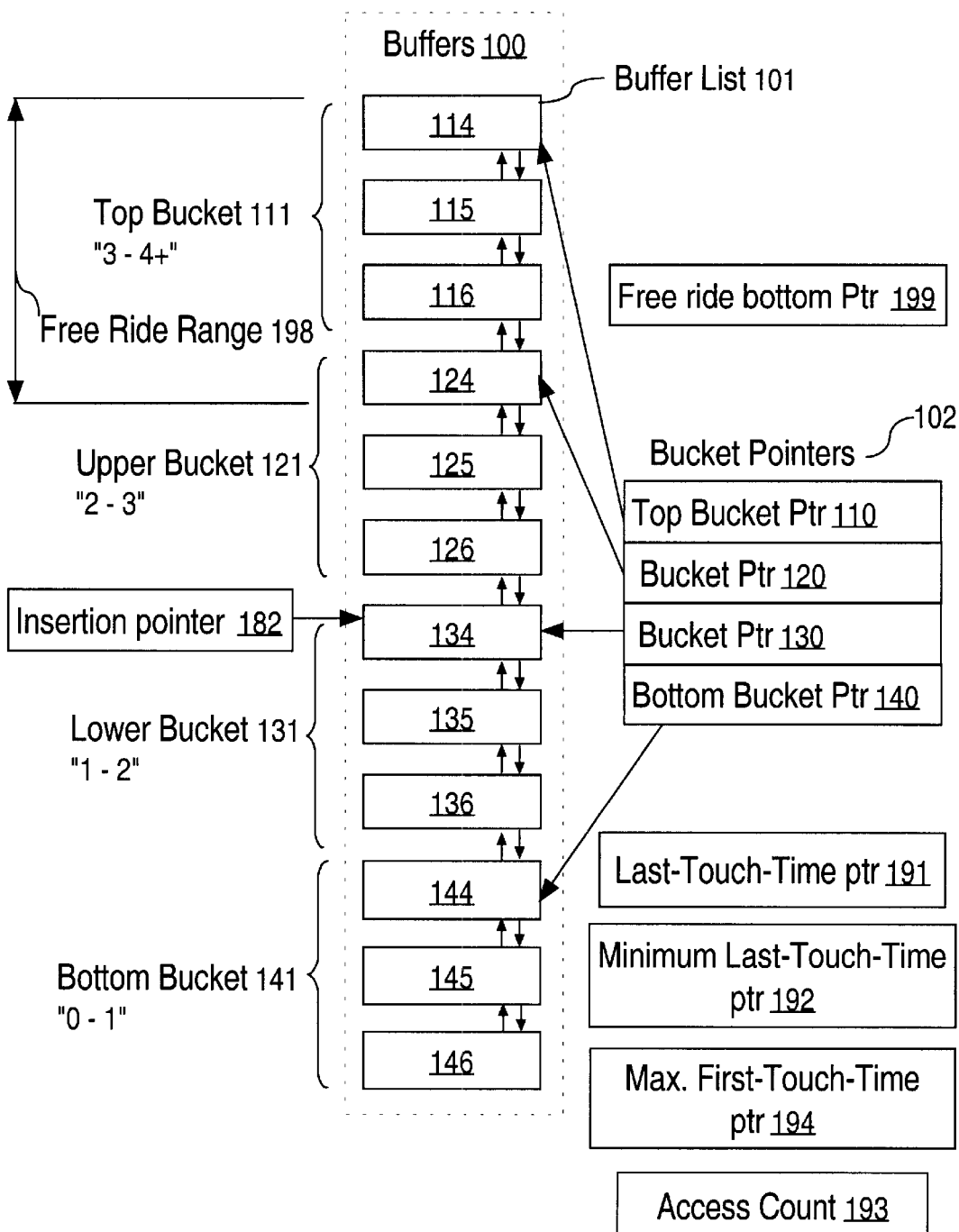
FIG. 1 depicts a list of buffers, buckets and profit values with which the buffers are associated, and other pointers used to manage the buffers and buckets and their order according to an embodiment of the present invention.

A method and apparatus for buffering data is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

FUNCTIONAL OVERVIEW

A set of buffers is maintained in an ordered list based on a profit value generated for each buffer. The profit value for a buffer reflects multiple access characteristics of the buffer. The list of buffers is partitioned into divisions referred to as buckets. Each bucket contains a set of buffers and is associated with a subrange of the full range of profit values that may be generated. The bucket that covers the very top of the list is associated with highest profit value subrange, the bucket that covers the bottom of the list is associated with the lowest profit value subrange.

When buffers are accessed, their profit values may be computed. If the newly-computed profit value of the buffer that is accessed does not fall within the subrange of the bucket that contains the buffer, the buffer is moved to the bucket with the profit subrange that does cover the profit value. By continually recomputing the buffers' profit value and placing the buffers in buckets that have corresponding profit value subranges, and which are ordered by those profit value subranges, the buffers themselves are maintained in an order that at least approximates the order of their profit value.

When data is first placed in a buffer, the buffer's position within the buffer list is not immediately based on its profit value. Instead, an access history is first accumulated for the buffer and, once accumulated, the buffer's profit value earns the buffer's place in the list. Specifically, after new data is added to a buffer, it is placed at the insertion point of the list. When the buffer is next accessed, it is placed at the top of list. Placing the buffer at the top of the list in response to the second access initiates a "free ride" period for the buffer. A free ride refers to a buffer's journey down the list during a period in which a buffer's position is not changed in response to being accessed. The free ride range refers to the range of positions in the buffer list through which the buffer may travel before its free ride is terminated.

As other buffers are added to the top of the list above the buffer, the buffer is pushed down the list. As the buffer is pushed down, its access history is updated, but its order within the list is left unchanged. When the buffer reaches a certain position within the list, the "free ride" is terminated. From this point, the buffer's profit value is used as the basis for determining the buffer's place in the list.

According to another aspect of the present invention, a buffer's profit value is a function of multiple access characteristics. Specifically, one or more profit factors that each reflect one or more access characteristics are used to generate the profit values. Examples of profit factors include, but are not limited to, normalized values that reflect (1) a buffer's relative frequency of access (i.e. relative to other buffers in the cache), (2) a buffer's relative recency of access, (3) the relative tenure of data currently residing in a buffer, or (4) the relative frequency of access within a subset of accesses to any buffers in the cache. In calculating a profit value for a buffer, the profit factors may be accorded equal weight, or accorded weight by application of any desired function.

The techniques described herein provide advantages over conventional methods of maintaining lists of buffers. Buffers are organized into buckets that correspond to ranges of profit value. Because the buckets are themselves ordered by profit value, the buffers are left in an order that at least approximates the profit value. Furthermore, placing a buffer in a bucket that corresponds to the range that includes the buffer's profit value requires less operations than other conventional methods that may used for ordering buffers by profit. Such other methods include scanning the entire list to find a place for the buffer, or using a profit value based index (e.g. b-tree) for the list. Thus, the order of the buffers is maintained according to profit more efficiently. Finally, once buffers have established an access history, their order within the list is based on a profit value that is applied consistently and that is based on multiple access characteristics.

Exemplary Buffers and Buckets

The present invention is related to the use of buffering data in a computer system. As a computer system runs, it maintains and accesses buffers in a cache. FIG. 1 shows an exemplary set of buffers upon which an embodiment of a present invention operates.

FIG. 1 shows buffers 100 organized as a doubly linked buffer list 101. Each of buffers 100 contains pointers that are used to form the buffer list 101. One pointer points to a subsequent buffer in the list. Another pointer points to a preceding buffer in the list. For example, buffer 115 contains a pointer that points to buffer 114, and another pointer points that points to buffer 116.

Buffer list 101 is divided into one or more ordered sections referred to as buckets. Each bucket is associated with a profit value subrange, which covers a portion of complete range profit values that may be generated for buffers. For purposes of illustration, the profit values may range from 0 to just above 4. The profit buckets are ordered according to their profit value subrange. Top bucket 111 is associated with the highest profit value subrange (i.e. 3–4+), bottom bucket 141 is associated with the lowest profit value subrange (i.e. 0–1).

The first buffer in each bucket is pointed to by a pointer from bucket pointers 102. Bucket pointers 102 include top bucket pointer 110, bucket pointer 120, bucket pointer 130, and bottom bucket pointer 140. Top bucket pointer 110 points to buffer 114, the first buffer in top bucket 111. Bottom bucket pointer 140 points to buffer 144, the first buffer in bottom bucket 141.

When new data is added to a buffer, the buffer is moved to the insertion point within buffer list 101. Insertion pointer 182 points to the buffer that currently resides at the insertion position, which as shown in FIG. 1, is buffer 134. Insertion pointer 182 is maintained so that it refers to the insertion point. It is not necessary that the insertion point coincide with the top of lower bucket 131, or the top of any other bucket.

Buffers 100 also contain other pointers used to form other doubly linked ordered lists, such as a last-touch-time list, and a first-touch-time list. The last-touch-time list reflects the order in which each of buffers 100 was last accessed. The most recently accessed buffer resides at the top of the list, and is pointed to by last-touch-time pointer 191. The buffer that was least recently accessed resides at the bottom of the list, and is pointed to by the minimum last-touch-time pointer 192.

Whenever one of buffers 100 is accessed, the last-touch-time list is reordered accordingly. Specifically, the just accessed buffer is moved to the top of the list, and last-touch-time pointer 191 is reset to point to the just accessed buffer. If the buffer is at the bottom of the list, the minimum last-touch-time pointer 192 is reset to point to buffer that preceded the just accessed buffer. Moving a buffer within the list involves well known operations to pointers used to form linked list, and these operations shall not be further described.

The order of the first-touch-time list is maintained to reflect the order in which data was added to buffers 100. The buffer to which data was most recently added resides at the top of the list, and is pointed to by maximum first-touch-time pointer 194. Whenever new data is added to one of buffers 100, the first-touch-time list is reordered accordingly. Specifically, the buffer to which data was just added is moved to the top of the list, and maximum first-touch-time pointer 194 is reset to point to the buffer.

Free ride bottom pointer 199 points to the bottom of free ride range 198. The buffer pointed to by free ride bottom pointer 199 and the buffers above the pointed to buffer are in the free ride range 198. Accordingly, buffer 114, 115, 116, and 124 are in free ride range 198. In an embodiment of the invention, free ride bottom pointer 199 is maintained so that the number of buffers in the free ride range 198 remains constant, and is set to point to a buffer that resides in a position above the top of bottom bucket 141 (i.e. the position pointed to by bottom bucket pointer 140).

Access counter 193 is a sequential counter that is incremented each time data in one of buffers 100 is accessed.

Exemplary Buffer

Figures 1, 3A:
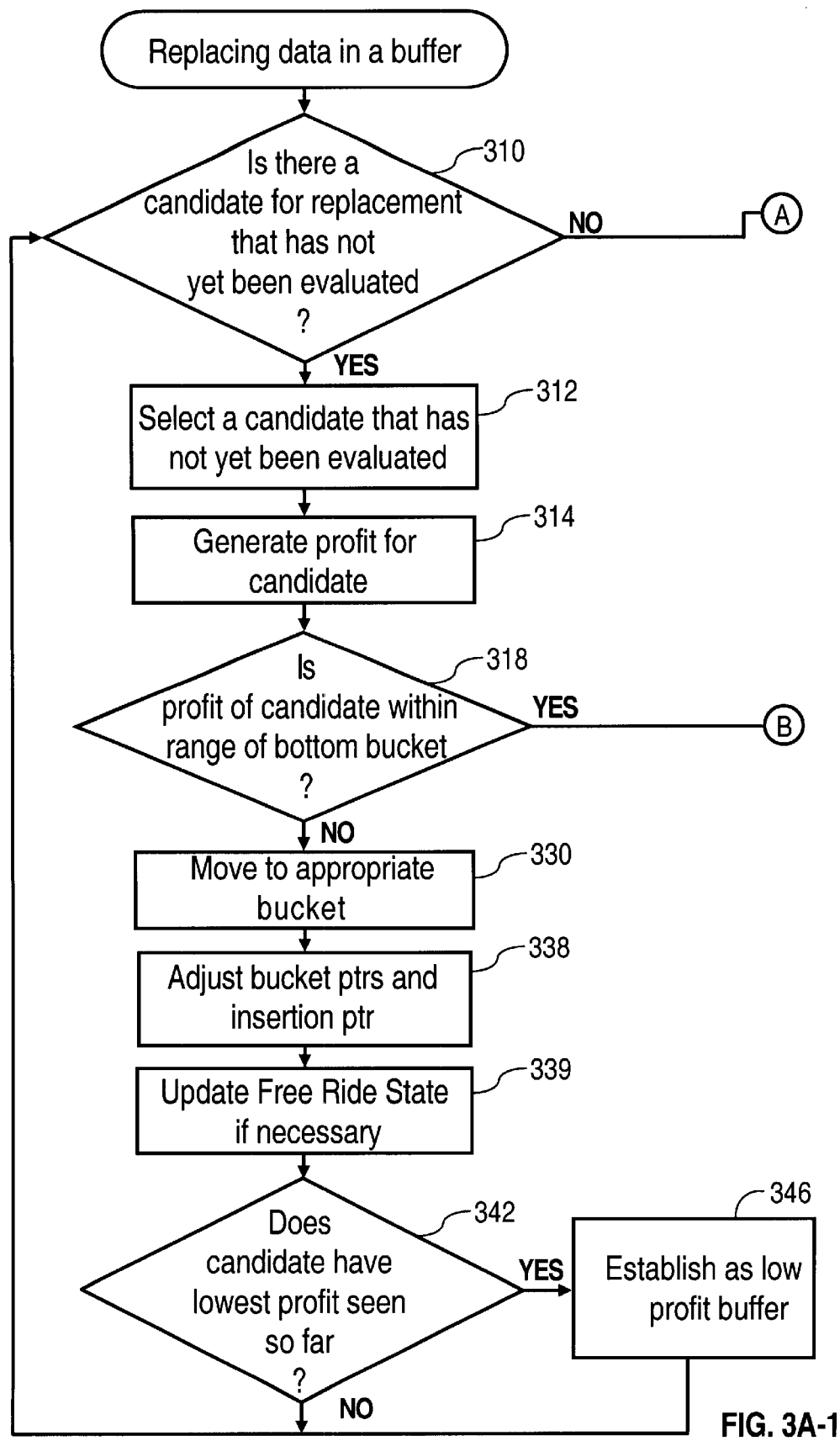
Figures 2, 3A:
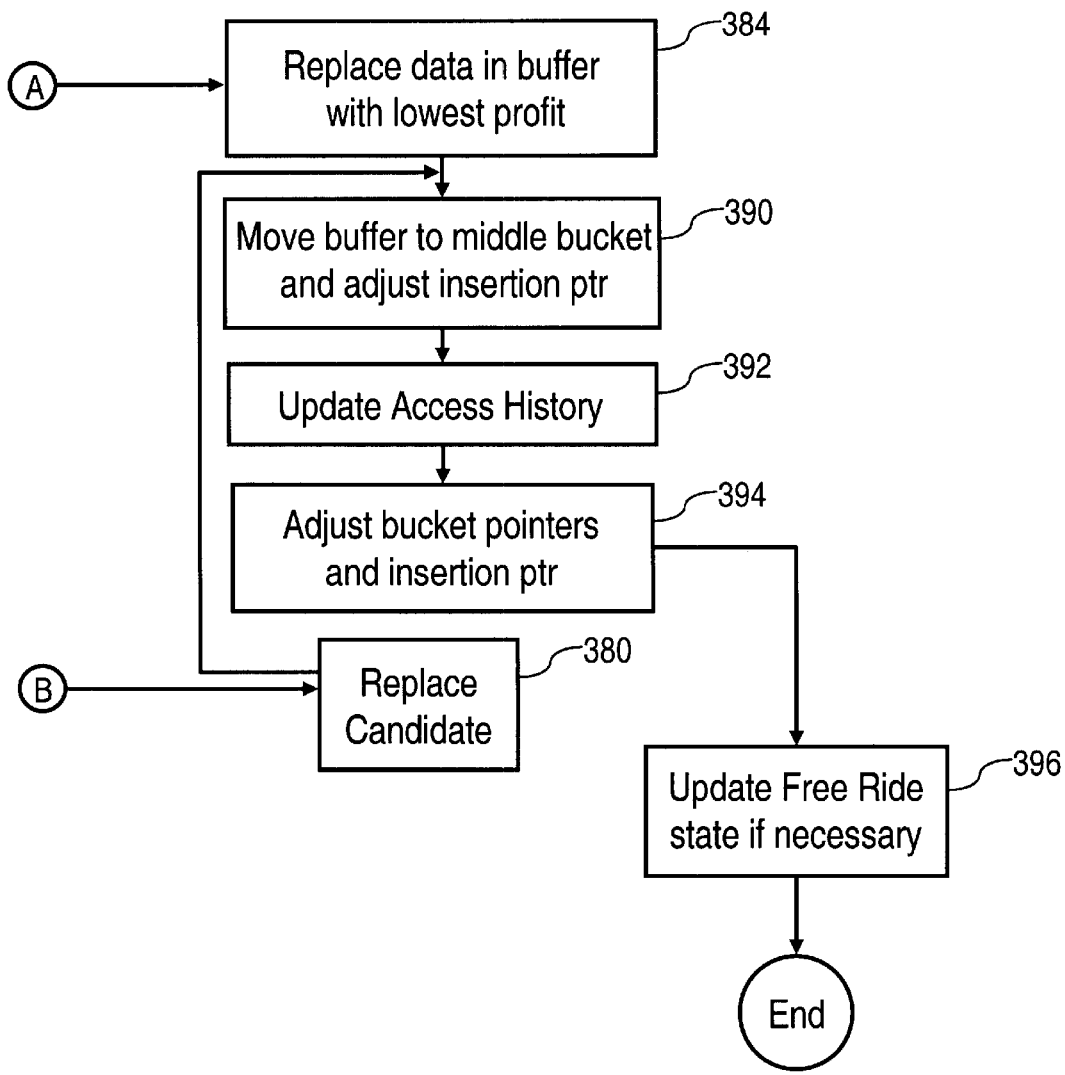

FIG. 2 shows, in more detail, one of the buffers 100 according to an embodiment of the present invention. Buffer 114, like each of buffers 100, contains various fields of data which are used to manage buffers 100, including fields used to reflect the access history of a buffer 114.

In particular, free ride flag 212 indicates whether or not buffer 114 is on a free ride. Free ride relative flag 213 indicates whether or not buffer 114 is within free ride range 198, or below it. A buffer is on a free-ride if its free ride flag 212 indicates that the buffer is on a free ride, and its free ride relative flag indicates that the buffer is in the free ride range.

Touch count 214 indicates the number of times the data presently stored in buffer 114 has been accessed. Thus, touch count 214 is set to one whenever new data is stored in buffer 114. Last-touch-time 216 indicates the last time buffer 114 was accessed. First-touch-time 218 indicates when the data that currently resides in buffer 114 Was added to buffer 114.

In one embodiment of the present invention, access counter 193 generates time values that are used to indicate when a buffer was accessed. Specifically, when buffer 114 is accessed, last-touch-time 216 is set to the current value of the access counter 193. When data is added to buffer 114, first-touch-time 218 and last touch time 216 are set to the value of access counter 193.

As mentioned above, buffer 114 belongs to multiple lists. Various pointers associated with buffer 114 are used to link buffer 114 to its place within those lists. Specifically, buffer 114 is linked into buffer list 101 by pointers 220 and 222. Next buffer pointer 220 points to the buffer that follows buffer 114 in buffer list 101, and previous buffer pointer 222 points to the buffer that precedes buffer 114 in buffer list 101.

Buffer 114 is linked into the last-touch-time list by pointers 232 and 234. Previously touched pointer 232 points to the buffer whose most recent access was right before the most recent access to buffer 114, and subsequently touched pointer 234 points to the buffer whose most recent access was immediately after the most recent access to buffer 114.

Buffer 114 is linked into the first time touched list by pointers 242 and 244. Previously added pointer 242 points to the buffer to which data was added before the data that currently resides in buffer 114 was added to buffer 114, and subsequently added pointer 244 points to the buffer into which data was added immediately after data was added to buffer 114.

Selecting a Buffer for Replacing Data

Computer systems have a limited amount of resources. Consequently, there is usually a cap on the number of buffers that can be allocated to store data. When no more buffers can be allocated, new data is stored into buffers that are already storing data, thus replacing the old data with the new data. If data to be replaced is dirty and has not been written to a storage media, the data is first written to a storage media before being replaced.

FIGS. 3A-1 and 3A-2 show steps that are performed to select a buffer into which new data is to be stored. According to one embodiment, the computer system selects the buffer that is to receive the new data from bottom bucket 141. To make the selection, the computer system examines one or more buckets in the bottom bucket 141, determining the profit value of each. If the profit value does not match the profit value subrange of bottom bucket 141, then the buffer does not belong in the bottom bucket, and is moved to the appropriate bucket. If the buffer being examined has a profit value within the profit value subrange of bottom bucket 141, then it is selected to receive the new data. If the data that currently resides in the selected buffer needs to be preserved, it is copied to another storage medium prior to storing the new data in the buffer. The buffer is then moved to the insertion position pointed to by insertion pointer 182.

It is possible that none of buffers in bottom bucket 141 belong there. That is, all of the buffers in the bottom bucket 141 have profit values that fall outside the range associated with the bottom bucket 141. When this rather unlikely situation occurs, the buffer with the lowest profit value in the bottom bucket is selected.

Figure 3B:
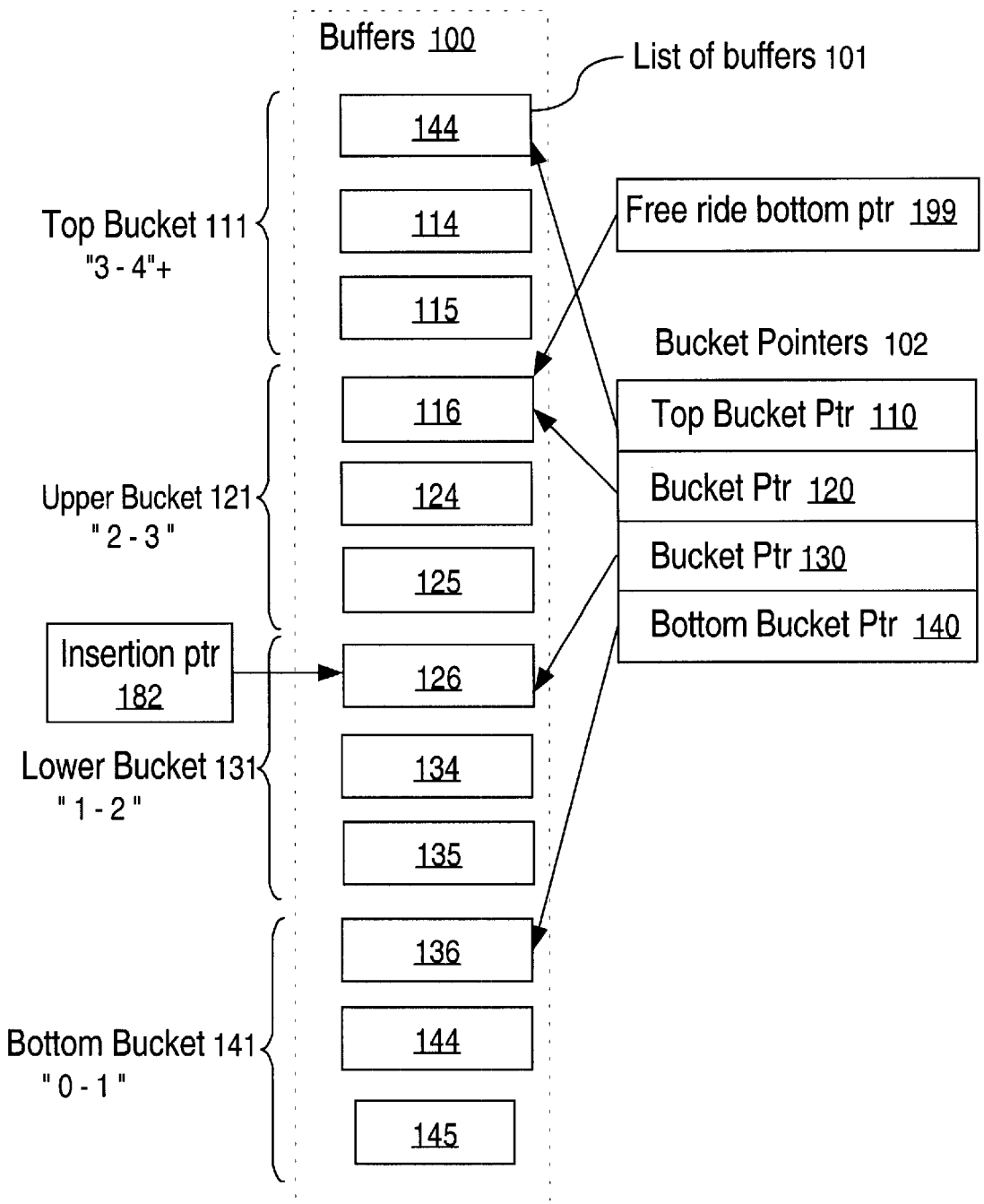
FIG. 3B depicts the list of buffers and their order at a particular point in an example used to illustrate an embodiment of the present invention.
Figure 3C:
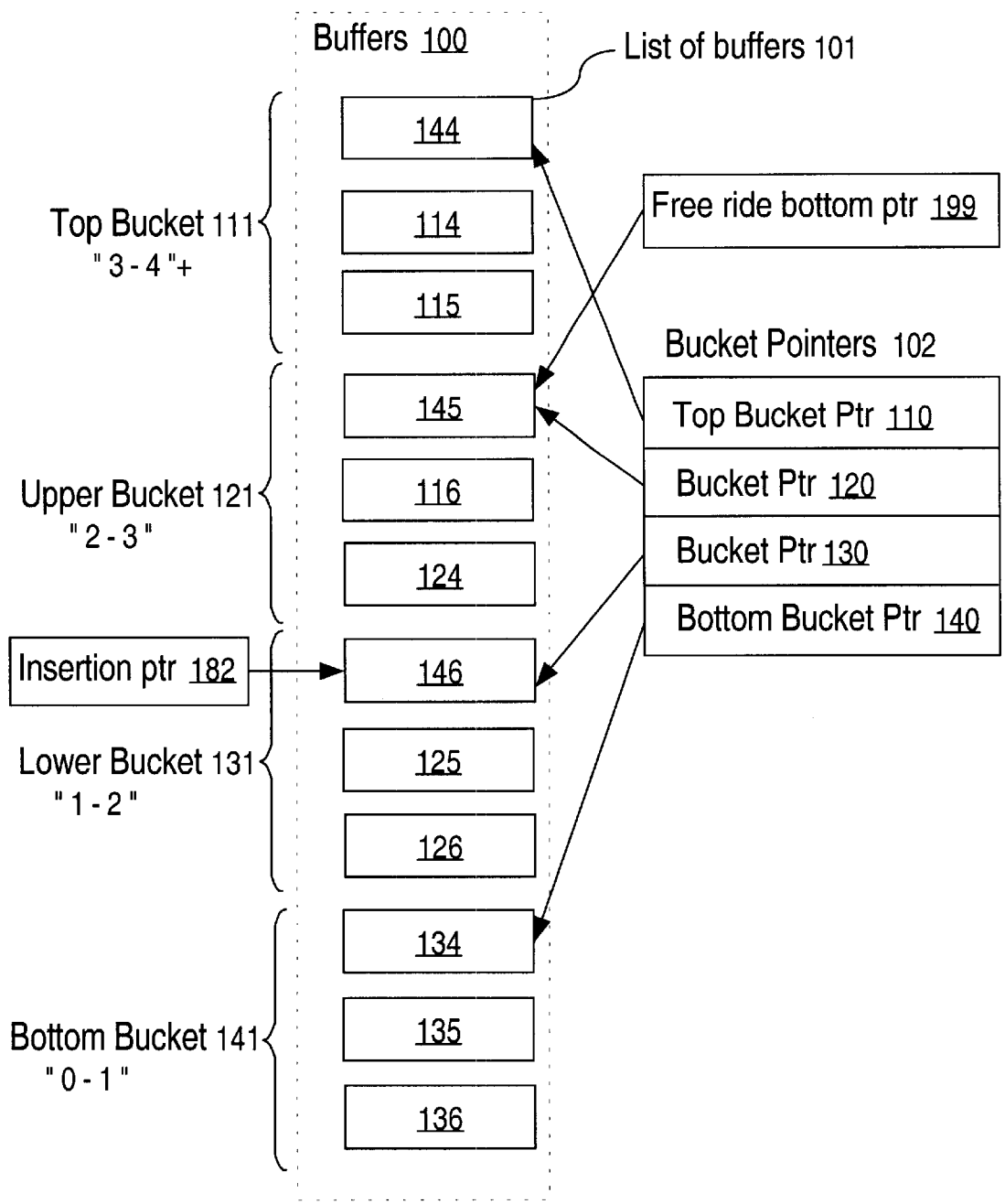
FIG. 3C depicts the list of buffers and their order at a particular point in an example used to illustrate an embodiment of the present invention.

Buffers 100 are used to illustrate the steps shown in FIGS. 3A-1 and 3A-2. FIG. 1 shows the order of buffers 100 in buffer list 101 before the steps are performed in the following illustration. FIG. 3B and FIG. 3C show the order of buffers 100 in buffer list 101 at various stages of the illustration. The steps illustrated in FIGS. 3A-1 and 3A-2 are initiated when a computer system has determined that it must access data that is not stored in any of buffers 100.

Referring to FIGS. 3A-1 and 3A-2, at step 310, it is determined whether there is a buffer in bottom bucket 141 that has not yet been evaluated as a candidate for replacement. If there is a buffer in bottom bucket 141 that has not yet been evaluated as a candidate for replacement, then control flows to step 312. Otherwise, control flows to step 384. In this example, buffers 144, 145 and 146 have not been examined. Therefore, control then flows to step 312.

At step 312, one of the buffers in the bottom bucket that have not yet been examined is selected. In this example, buffer 144 is selected as the candidate for replacement. Control then flows to step 314.

At step 314, a profit value is generated for the candidate. In this example, a profit value of 3.25 is generated. The profit value is generated according to an exemplary technique for generating profit values which shall be later described. Control then flows to step 318.

At step 318, it is determined whether or not the profit value of the candidate is within the profit value subrange of the bottom bucket 141. If the profit value is within this subrange, then control flows to step 380, where the data in the candidate buffer is replaced with the needed data. Otherwise, control flows to step 330. In this example, the profit value 3.25 does not fall within zero and one, the profit value range associated with bottom bucket 141. Therefore, control flows to step 330.

At step 330, the candidate buffer is moved to the appropriate bucket. In this example, the profit value 3.25 falls within the range of top bucket 111, which is 3 to over 4. Therefore, buffer 144 is moved to the top of top bucket 111. Control, then flows to step 338.

Moving a particular buffer from one bucket to the top of another bucket involves a series of operations to various pointers. The affected pointers include one or more bucket pointers 102, and pointers that are used to form buffer list 101 in both the buffer being moved and in other buffers. These other buffers include the buffer that preceded the buffer being moved, the buffer that follows it, the buffer that may precede the buffer being moved after it is moved, and the buffer that may follow it. In this example, top bucket pointer 110 is set to point to buffer 144. Within buffer 144, next buffer pointer 220 is set to point to buffer 114. To reflect that buffer 144 was removed from the position between buffer 136 and 145, pointers in buffer 136, 144, and 145 are reset. In particular, in buffer 136 the next buffer pointer 220 is set to point to buffer 145, and in buffer 145 previous buffer pointer 222 is set to refer to buffer 136. Those skilled in the art will recognize that whenever a buffer is moved from one bucket to the top of another, similar pointer operations are performed. Therefore, these operations shall not be further described.

Whenever a buffer is moved from a lower position to an upper position within buffer list 101, all buffers between the just moved buffer's former and new positions move down one position in the buffer list 101. As a result, some buffers move from one bucket to a lower bucket, and a buffer may move to the insertion point. To reflect this movement through buffer list 101, bucket pointers 102 and insertion pointer 182 are modified accordingly.

In addition, buffers within the free ride range 198 may be affected. Specifically, a buffer may be moved into free ride range 198. Furthermore, the buffer pointed to by free ride bottom pointer 199 may move below free ride range 198, and another buffer may move into the position formerly occupied by the buffer that just moved below free ride range 198. To reflect the movement in and out of the free ride range 198, free ride bottom pointer 199, and the free ride flag 212 and free ride relative flag 213 of one or more buffers are updated.

In this example, buffer 144 was moved to top bucket 111. Consequently, buffers 114 through 136 move down one position within the buffer list 101 while retaining their relative order. Furthermore, buffer 116, which was in top bucket 111, moves down to upper bucket 121, where buffer 116 becomes the top buffer in upper bucket 121. Likewise, buffer 126 has moved to lower bucket 131 and becomes the top buffer in lower bucket 131, and buffer 136 moves to bottom bucket 141 and becomes the top buffer in bottom bucket 141. In addition, buffer 126 has moved into the insertion position. Finally, buffer 124 has moved out of free ride range 198. FIG. 3B shows the resulting shift in order of buffers 100 after moving buffer 144 to the top of top bucket 111.

At step 338, bucket pointers 102 and insertion pointer 182 are adjusted to reflect the just described reshuffling of buffers within buffer list 101. In this example, bucket pointer 120 is reset to buffer 116, bucket pointer 130 is reset to point to buffer 126, bottom bucket pointer 140 is reset to point to buffer 136. Insertion pointer 182 is reset to point to buffer 126. Control then flows to step 339.

At step 339, the free ride state is updated if there has been movement within free ride range 198. Specifically, the free ride relative flag 213 of the buffer that has just been moved into free ride range 198 is set to indicate that the buffer is within free ride range 198. In addition, the free ride relative flag 213 of the buffer that has just moved below free ride range 198 is set to indicate that the buffer is below free ride range 198. If that buffer's free ride flag 212 was previously set to indicate that the buffer was on a free ride, then its free ride flag 212 is now reset to indicate that the buffer is no longer on a free ride. Finally, free ride bottom pointer 199 is reset to the buffer that has just moved to the bottom of the free ride range 198. In this example, the free ride relative flag 213 of buffer 144 is set to indicate that buffer 144 is within free ride range 198. The free ride relative flag 213 of buffer 124 is set to indicate that buffer 124 is below free ride range 198. If the free-ride flag 212 of buffer 124 was previously set, it is now reset. Free ride bottom pointer 199 is reset to point to buffer 116.

At step 342, it is determined whether the candidate has the lowest profit seen so far. If the candidate has the lowest profit seen so far, then control flows to step 346, where the candidate is established as the lowest profit buffer. Otherwise, control returns to step 310. In this example, because buffer 144 is the first buffer being examined, it has the lowest profit seen so far. Therefore, control flows to step 346, where buffer 144 is established as the low profit buffer. Control then flows to step 310.

Continuing with the current example, buffers 145 and 146 are examined in the manner similar to that described for buffer 144. Neither buffer 145 nor buffer 146 has a profit value falling within the subrange of bottom bucket 141. The profit value generated for buffer 145 is 2.25, and therefore buffer 145 is moved to upper bucket 121. Similarly, the profit value generated for buffer 146 is 1.25, and therefore buffer 146 was moved to lower bucket 131. As a result of moving buffers 145 and 146, the order of buffer list 101 has changed. FIG. 3C reflects the change in order.

Buffer 146 has the lowest profit value among the original bottom bucket buffers. For purposes of illustration, the steps have been executed until step 346, where buffer 146, the candidate buffer, is established as the low profit buffer. Control then flows to step 310.

At step 310, it is determined whether there is a next candidate for replacement. Because all the original buffers in the bottom bucket 141 have been examined, there is no next candidate for replacement. Therefore, control flows to step 384. At step 384, the data in the buffer established as the lowest profit buffer is replaced with the needed data.

At step 390, the buffer in which data was just replaced is moved to the insertion point and insertion pointer 182 is set to point to the just moved buffer, unless the buffer is already there. In this example, because bucket 146 is pointed to by insertion pointer 182, buffer 146 already resides as the insertion position, and no additional operations are needed to perform step 390. Control then flows to step 392.

At step 392, the data structures used to reflect the access characteristics of the data buffer are updated. Specifically, touch count 214 is initialized to one, and last-touch-time 216 is set to the current value of access counter 193, and first-touch-time 218 is set to the current value of the access counter.

At step 394, the bucket pointers 102 and the insertion pointer 182 are updated to reflect the movement of buffers resulting from performing step 390, in a manner similar to that described for step 338. Execution of the steps then flows to step 396, where the free ride state is updated in a manner similar to that described for step 339. Execution of the steps then ceases.

If at step 318, a candidate had been found that had a profit value that fell within the subrange of the bottom bucket 141, then control would have flowed to step 380. At step 380, the data in the buffer is replaced with the needed data. Control then would flow to step 390. Thus, buffers within the bottom bucket 141 are evaluated as candidates for replacement until the earlier of (1) all the bottom bucket buffers have been evaluated, and (2) a bottom bucket buffer is encountered that has a profit value that falls within the subrange of the bottom bucket 141.

The order in which buffers were selected in step 312 is expository. In an embodiment of the present invention, rather than beginning the selection of buffers with those at the top of bottom bucket 141, the selection begins at the bottom of bottom bucket 141. In this case, a pointer may be used to point to the bottom of bottom bucket 141.

Accessing Buffers That Already Contain Needed Data

Frequently, data that is required by a computer system will already reside in a buffer. FIG. 4 shows the steps performed when a computer system accesses data that already resides in a buffer, according to an embodiment of the invention.

When accessing the buffer, a determination is made as to whether or not the buffer should be on a free ride. If the buffer should be on a free ride but is not, the buffer is put on a free ride. If the buffer is on a free ride, then it is left in its current position if still in the free ride range; otherwise, it is moved to the bucket that is appropriate for the buffer's profit value. Buffers 100 are used to illustrate the steps of FIG. 4A. For purposes of illustration, the computer system is accessing data that resides in buffer 134. The order of the buffers in buffer list 101 is depicted in FIG. 1. As the buffers are accessed in the following illustration, their order in buffer list 101 changes. FIG. 4B and FIG. 4C depict the order of the buffers in buffer list 101 at various stages of the illustration.

Figure 4A:
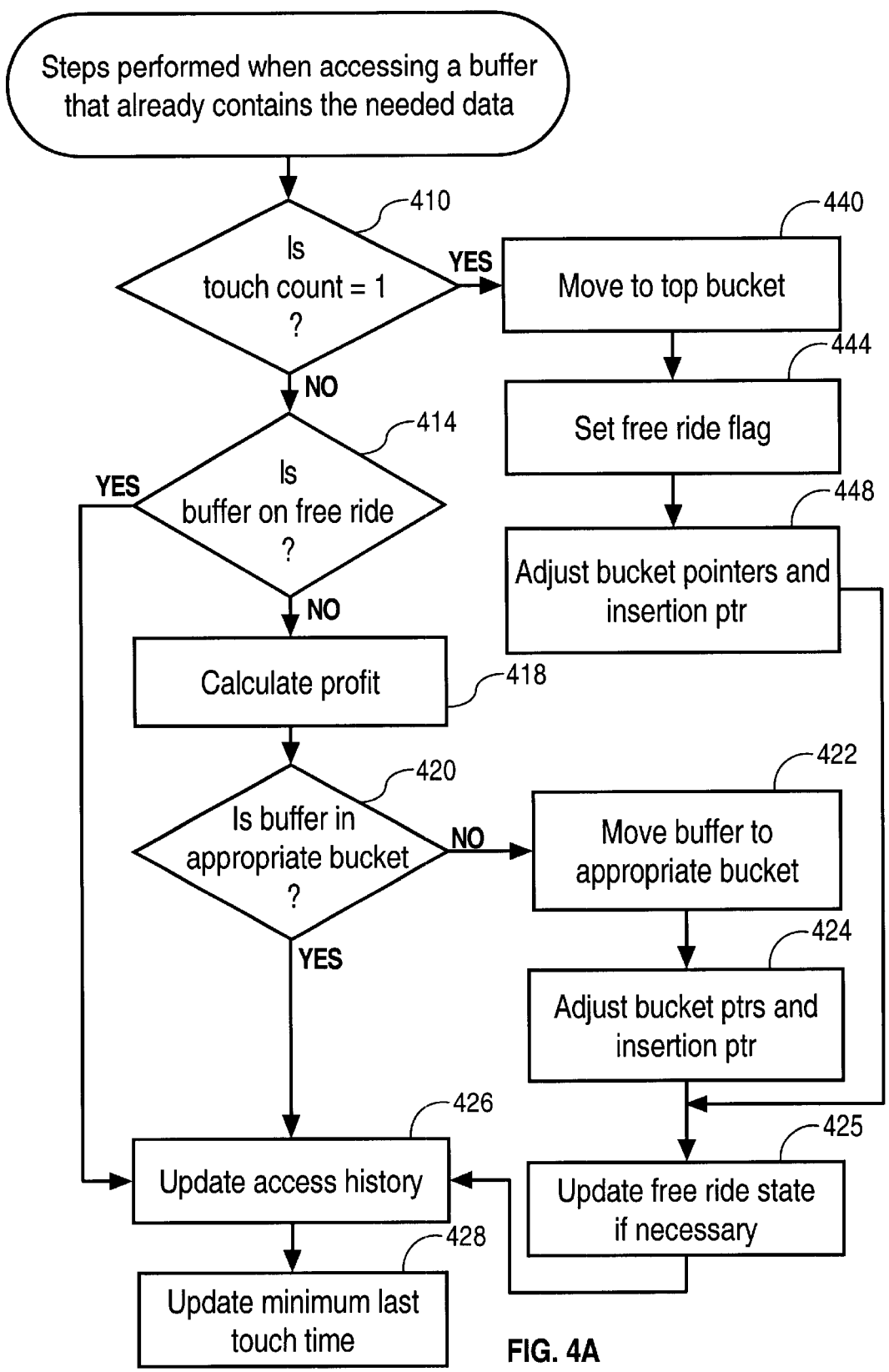
FIG. 4A is a flow chart showing steps performed when accessing data in a buffer that already resides in a buffer.
Figure 4B:
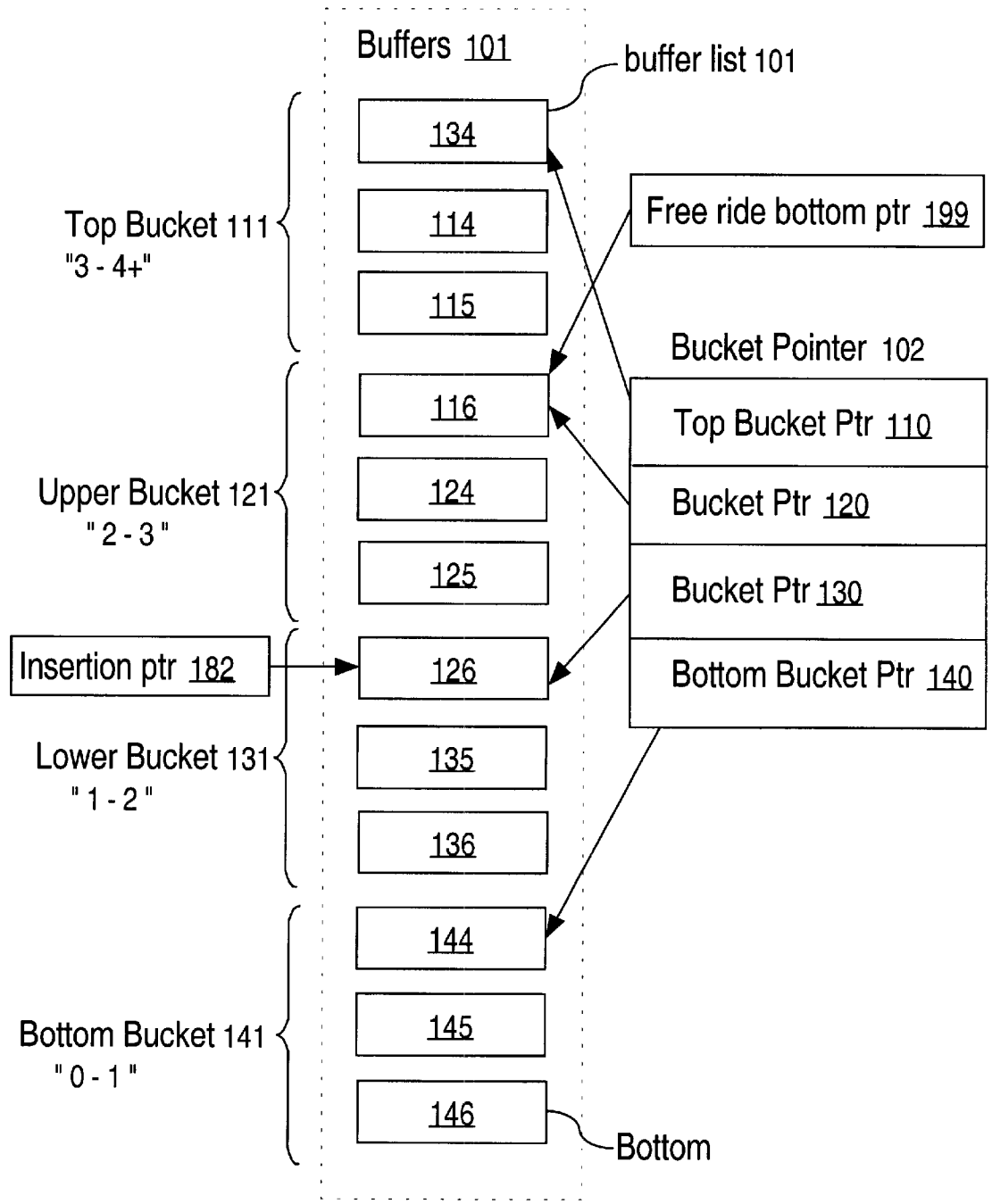
FIG. 4B depicts the list of buffers and their order at a particular point in an example used to illustrate an embodiment of the present invention.
Figure 4C:
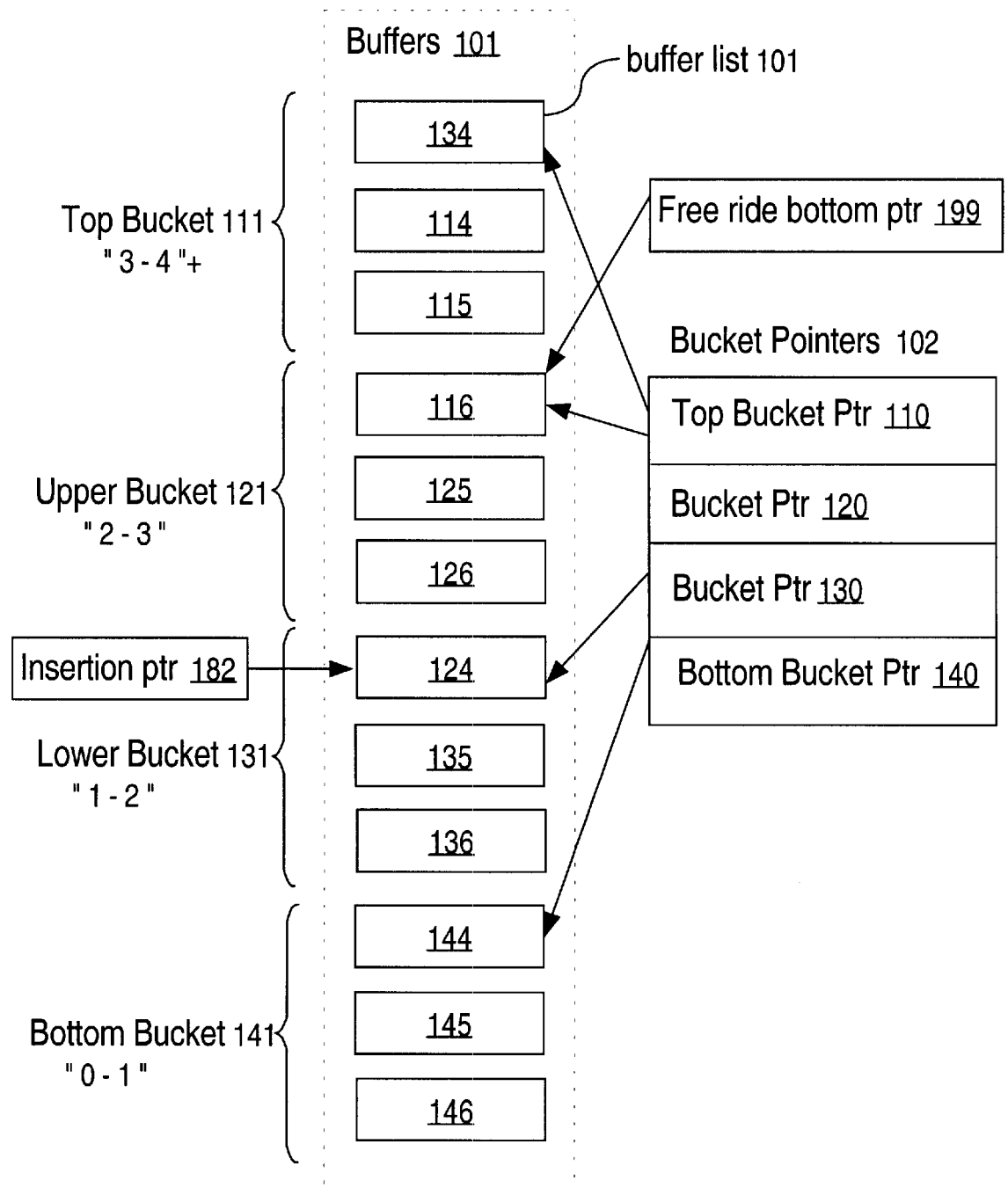
FIG. 4C depicts the list of buffers and their order at a particular point in an example used to illustrate an embodiment of the present invention.

Referring to FIG. 4A, at step 410, it is determined whether or not the touch count of the buffer being accessed is equal to one. If the touch count is equal to one, then control flows to step 440, where the operations for putting the buffer on a free ride are commenced. Otherwise, control flows to step

414. In this example, for purposes of illustration, the touch count 214 of buffer 134 contains a value of one. Therefore, it is determined that the touch count is equal to one, and control flows to step 440.

At step 440, the buffer is moved to the top of the top bucket 111 to begin its free ride. At step 444, free ride flag 212 is set to indicate that the buffer is on a free ride. At step 448, the bucket pointers 102 and insertion pointer 182 are adjusted as necessary to reflect movement of buffers within buffer list 101 that occurs after moving the buffer 134 to the top of bucket 111, in a manner similar to that described for step 338. At step 425, the free ride state is updated, in a manner similar to that described for step 339. Execution of the steps then flows to step 426.

For another example, assume that the computer system has just determined that it needs to access data in buffer 124, which is still at the top of buffer list 101. At step 410, the touch count does not equal one, and thus control flows to step 414. At step 414, it is determined that the buffer 124 is on a free ride based on its free ride flag 212 and free-ride relative flag 213. If the free ride flag is set indicate that buffer 124 is on a free-ride, and the free ride relative flag of buffer 124 indicates that buffer 124 is in the free-ride range, then buffer 124 is on a free-ride. The combination of the free ride flag and the free ride relative flag is an efficient technique for quickly determining whether a buffer is on a free ride. Alternate techniques for making the determination in step 414 include scanning the buffer list 101 to determine whether the buffer's position is below free ride bottom pointer 199. In this example, free ride flag 212 and free ride relative flag 213 together indicate that buffer 124 is in the free ride range. Therefore, control flows to step 426.

Afterwards, the computer system accesses various buffers of buffers 100, causing buffer 124 to trickle down to the position shown in FIG. 4B, just beyond the free ride range. For purposes of illustration, in the current example, the computer system again determines that it needs to access data in buffer 124. At step 410, it is determined that the touch count 214 of buffer 124 is not equal to one. Therefore, control flows to step 414.

At step 414, it is determined whether or not buffer 124 is on a free ride. If the buffer is on a free ride, control then flows to step 426. If the buffer is not on a free ride, then control flows to step 418. In this example, the free ride flag 212 and free ride relative flag of buffer 124 are examined. Free ride flag 212 indicates that buffer 124 is on a free ride, however, free ride relative flag 213 indicates that buffer 124 is below free ride range 198. Therefore, control flows to step 418.

At step 418, the profit value of the buffer is recalculated. In this example, the profit value calculated is 1.25. Control then flows to step 420.

At step 420, it is determined whether or not the buffer is in the appropriate bucket for its profit value. If it is determined that the buffer is in the appropriate bucket, then control flows to step 426. Otherwise, control flows to step 422, where the buffer is moved to the appropriate bucket, and then to step 424, where bucket pointers 102 and insertion pointer 182 are adjusted in manner similar to step 338. At step 425, the free ride state is updated, if necessary, in a manner similar to that described for step 339.

In this example, buffer 124 is in upper bucket 121. The subrange of upper bucket 121 is 2–3. The profit value of buffer 124 does not fall into this subrange (i.e. 1.25 does not fall with the subrange of 2–3), however, it does fall within the subrange of lower bucket 131. Therefore, it is determined that the buffer is not in the appropriate bucket for its profit subrange, and control flows to step 422. At step 422, buffer 124 is moved into lower bucket 131, which is associated with the subrange that includes the profit value generated for buffer 124. Then control flows to step 424, where bucket pointer 130 and bottom bucket pointer 140 and the insertion pointer 182 are adjusted accordingly. Because there is no movement within the free ride region, no updates are performed in step 425. Control then flows to step 426. FIG. 4C shows the resulting order of buffers 101.

At step 426, the access history of buffer 124 is updated. These updates include incrementing the touch count 214 and setting the last-touch-time 216 to the current value of the access counter. Execution of the steps then ceases.

Profit Terminology

To determine profit, the computer system generates and uses a variety of data values. To facilitate a description of these data values, the following terminology is used.

GT is the total number of times any of buffers 100 have been accessed. For a given moment, the value in access counter 193 is used as the value GT.

$TC_i$ is the touch count of a particular buffer. The value in touch count 214 is used as the value for $TC_i$.

$TC_{max}$ is the maximum touch count of all buffers 100.

$LT_i$ is the last-touch-time for a particular buffer. $LT_i$ is expressed in terms of the value of GT at the time the buffer was last accessed, and thus indicates the touch time relative to buffers 100.

$LT_{min}$ is the minimum $LT_i$ relative to buffers 100. This value may be found in the last-touch-time 216 of the buffer that resides at the bottom of the last-touch-time list. This buffer is referred to by the minimum last-touch-time pointer 192.

$FT_i$ is the first-touch-time of a particular buffer. $FT_i$ is expressed in terms of the value of GT at the time the data currently in the buffer was added to the buffer. This value is found in first-touch-time 218.

$FT_{max}$ is the maximum $FT_i$ among all buffers 100. This value may be found in first-touch-time 218 of a buffer at the bottom of the first-touch-time list. This buffer is pointed to by maximum first-touch-time pointer 194.

The term "window" refers to a subset of the $W_{size}$ most recent accesses to buffers 100.

$W_{tail}$ is the value of GT that corresponds to the first access in a window. To calculate $W_{tail}$, $W_{size}$ is subtracted from GT.

Exemplary Profit Value Calculation

In the exemplary profit value calculation technique described below, four profit factors are generated and summed to form a profit value. In one embodiment of present invention, each profit factor is normalized to a value between one to just above zero. There is a minor deviation that may cause a value to exceed 1, and this deviation is described in further detail. The profit values generated may thus fall within a range beginning just above four to just above zero. A description of the four profit factors follows.

$P_{Freq}$ reflects how frequently a buffer is accessed relative to other buffers 100. $P_{Freq}$ is calculated according to the following formula:

$$\frac{TC_i}{TC_{max}}$$

$TC_{max}$ may be generated in several ways, and they shall be later described in further detail. $P_{freq}$ profit factor gives greater weight to the most frequently accessed buffers, the most frequently accessed buffer having a maximum value of one.

$P_{rec}$ reflects how recently a buffer was accessed. $P_{rec}$ is calculated according to the following formula:

$$\frac{LT_i - LT_{min}}{GT - LT_{min}}$$

This profit factor gives greater weight to the most recently accessed buffers, the most recently accessed buffer having a maximum value of one.

$P_{life}$ reflects the relative tenure of data in the buffer. Tenure is the length of time that the data in the buffer has been continuously stored in the buffer. The least tenured is data that has been most recently added to one of buffers 100; the most tenured is data that has been the least recently added to a buffer. $P_{life}$ is calculated according to the following formula:

$$\frac{FT_{max} - FT_i}{FT_{max}}$$

$P_{life}$ may be used to counter balance the excess profit that that may be attributed to data by $P_{rec}$. When data is first added to a buffer, for a given period of time the buffer may be accessed repeatedly, and then not at all. Under these circumstances, $P_{rec}$ may attribute too much profit to the buffer. This over emphasis may be countered by $P_{life}$. By combining $P_{life}$ and $P_{rec}$, recently accessed and less tenured data gets less weight, and recently accessed but more tenured data gets greater weight.

For example, a buffer A and buffer B have been accessed very recently, and accordingly, have $P_{Rec}$ values of 0.96 and 0.98 respectively. Buffer A is very tenured and has a $P_{life}$ of 0.98, while buffer B is not very tenured and has a $P_{life}$ value of 0.08. By combining (i.e. summing) $P_{life}$ and $P_{rec}$, buffer A and buffer B have profit values of 1.94 and 1.06 respectively. Buffer A, accessed about as recently as buffer B but occupied by more tenured data, is assigned a greater profit.

$P_{recfreq}$ reflects how frequently a buffer was accessed within a window. For example, a buffer is accessed 100 times within the last 1000 accesses to buffers 100. The value of 0.1 (100/1000) for $P_{recfreq}$ reflects how frequently a buffer A was accessed within a window. In one embodiment of the present invention, $P_{recfreq}$ is generated using one of three formulas. Which formula is used depends on one of the three following conditions.

Case 1: $W_{tail} \geq LT_i$ In this case, $LT_i$ is less than $W_{tail}$ and thus the buffer was not accessed within the window of recent accesses. Consequently, the value of $P_{recfreq}$ is always zero.

Case 2: $W_{tail} < FT_i$ In this case, $FT_i$ is greater than $W_{tail}$, and thus all accesses to the buffer for the data currently stored in the buffer occur within the window. The $P_{recfreq}$ in this case is generated according to the following formula:

$$\frac{TC_i}{W_{Size}}$$

Case 3: $FT_i \leq W_{tail} < LT_i$ In this case, some of the accesses to a buffer for the data that currently resides in the buffer occurs before the window, and some within the window. To generate $P_{recfreq}$, the portion of accesses that occur within the window is determined, and then divided by the window size.

An exact determination of this portion can be expensive in terms of computer resources. Here, exactness may require tracking for each access the current value of GT, and then counting which accesses are associated with values that are greater than $W_{tail}$. For example, a first access is associated with a GT value of 10, and a second access with a GT value of 20. Because $W_{tail}$ is 15, the first access occurs before the window, the second within the window.

To reduce the cost determining which portion of the accesses lies within the window, the portion may be approximated. In an embodiment of the present invention, to approximate the portion and to determine $P_{recfreq}$, the following formula is used.

$$(LT_i - W_{tail}/LT_i - FT_i) * (TC_i / W_{size})$$

$LT_i - W_{tail}/LT_i - FT_i$ is a ratio used to approximate the portion of accesses occurring within the window of most recent accesses. The ratio is used to linearly prorate a buffer's $TC_i$ value according to the respective differences between $W_{tail}$ and $LT_i$, and $FT_i$ and $W_{tail}$. If the difference between $LT_i$ and $W_{tail}$ is relatively greater, then $W_{tail}$ is closer to $FT_i$, the ratio is larger, and the portion of the accesses that are determined to have occurred within the window is greater. For example, assume data is added to a buffer A at a point that very closely corresponds to $W_{tail}$, and that buffer A was last accessed at a point relatively much later than $W_{tail}$. Specifically, the value of $TC_i$ is 10, $FT_i$ is 900, $W_{tail}$ is 910, and $LT_i$ is 950. The number of accesses to buffer A that are determined to have occurred within the window is 8 (i.e. 950–910/950–900*10). Because $FT_i$ is closer to $W_{tail}$ than is $LT_i$, a greater portion of the accesses are allocated to the window.

$P_{recfreq}$ attributes less weight to data that is accessed in bunches ("cyclically accessed"), and more weight to data that is accessed more uniformly. Cyclically accessed data tends to be accessed very frequently for a brief period of time, then accessed infrequently, and then accessed more frequently, and so on. Because uniformly accessed data is more likely to include accesses that fall within a window than cyclically accessed data, uniformly accessed data tends to have greater $P_{recfreq}$ values.

Calculating $TC_{MAX}$ $TC_{max}$ may be generated using a variety of techniques. One technique includes tracking the maximum $TC_i$ value among the buffers and maintaining a variable MAX containing the value of $TC_{max}$. When the $TC_i$ count for any buffer is increased, the new $TC_i$ value is compared to $TC_{max}$. If the new $TC_i$ value is greater than the $TC_{max}$, $TC_{max}$ is set to the new value. When data in a buffer is replaced, and $TC_i$ value for the buffer is equal to $TC_{max}$, the computer system determines the maximum $TC_i$ value in the remaining buffers. This determination may require scanning every buffer and reading the $TC_i$ value stored in touch count 214, a set of operations which together can be expensive.

To avoid such an expense, the buffers are not scanned when replacing data in the buffer that have a $TC_i$ value equal to MAX. Instead, the variable MAX is decremented by 1. After being decremented, MAX may not exactly reflect the true value of $TC_{max}$, and in fact, may be differ in one of several different ways. MAX may be greater than the true value of $TC_{max}$, or MAX may be lower. However, it is expected that any difference between MAX and the true value of $TC_i$ will have a negligible bearing on the utility of the generated profit values. To show how the such differences are negligible, the expected effects of MAX that is higher or lower than the true value of $TC_{max}$ are described below.

MAX may be less than $TC_{max}$ under the following condition. Two buffers may have $TC_i$ values that match $TC_{max}$. When one of them is replaced, and MAX is decremented by one, it's value is one less than $TC_i$ of the other buffer, and thus one less than the true value of $TC_{max}$. Later, the other buffer may be accessed and its profit value recomputed. Because $TC_i$ is by divided MAX to generate $P_{freq}$, and $TC_i$ is greater than MAX, $P_{freq}$ may be greater than 1.

The effect of $P_{freq}$ exceeding one is expected to be negligible for several reasons. First, it is expected that MAX will differ from the true value of $TC_{max}$ for a short period of time before it is adjusted to the true value. For example, in the previous example of buffer A and buffer B, when buffer B is reaccessed and the computer system determines that buffer B's $TC_i$ is greater than MAX, MAX will be adjusted accordingly. Or, another buffer with $TC_i$ greater than MAX may be accessed, and MAX then adjusted accordingly.

Second, because MAX is decremented by one, MAX and the $TC_i$ values that exceed MAX should only differ slightly. Accordingly, for a buffer with a $TC_i$ value greater than MAX, $P_{freq}$ should only slightly exceed one, and the profit value generated should not be skewed by an inflated $P_{freq}$.

Sometimes the value MAX can become much greater than any actual touch count, causing $P_{freq}$ values that are collectively too low. A technique of calculating $P_{freq}$ that addresses this problem follows. Under this technique, $P_{freq}$ is bounded and is based on the average touch count value ("AVG"). Specifically, $$P_{freq} = \frac{TC_i}{AVG} \quad \text{if } \frac{TC_i}{AVG} < 1; \text{ or}$$
$$= 1 \quad \text{if } \frac{TC_i}{AVG} > 1$$

AVG may calculated as:

$$\frac{TOUCH}{N}$$

N equals the number of buffers. TOUCH equals the sum of all $TC_i$ values in buffers 101. TOUCH may be maintained by updating a variable containing TOUCH when certain events occur. Specifically, on every access, TOUCH is incremented by one. When a buffer's data is replaced, in addition to incrementing TOUCH by one, the $TC_i$ of the buffer whose data is replaced is subtracted from TOUCH.

Tayloring the Generation of Profit Values

The generation of profit values may be taylored for a particular situation in a variety manners. For example, rather then giving each profit factor described above equal weight, some may be given greater weight than others. To vary the weight attributed to each profit factor, one or more profit factors may be multiplied by a weight factor, which may include constants or other profit factors. The following formula is an example of how profit values may be generated.

$$P_{freq}*P_{rec}+P_{freq}+0.5*P_{life}+P_{recfreq}$$

In addition, a computer system may be configured to receive and use parameters to control the generation of profit values. For example, input parameters may provide values for the weight factors, or the value of $W_{size}$.

Figure 5:
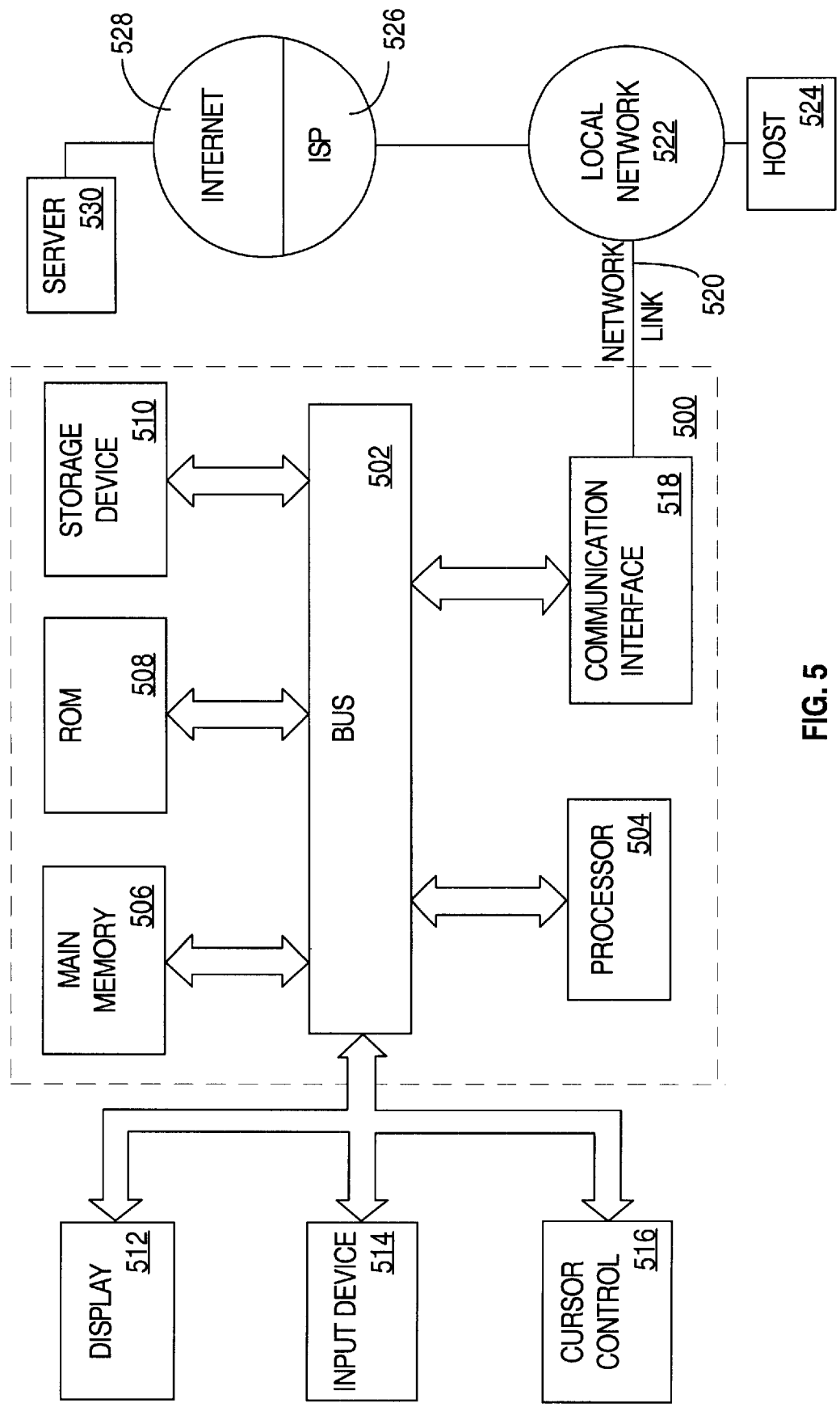
FIG. 5 is a block diagram depicting a computer system upon which an embodiment of the present invention may be implemented.

FIG. 5 is a block diagram that illustrates a computer system 500 upon which an embodiment of the present invention may be implemented. Computer system 500 includes a bus 502, and a processor 504 coupled with bus 502 for processing information. Computer system 500 also includes a main memory 506, such as a random access memory (RAM) or other dynamic storage device, coupled to bus 502 for storing information and instructions to be executed by processor 504. Computer system 500 further includes a read only memory (ROM) 508 to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

Computer system 500 also includes a communication interface 518 coupled to bus 502. Communication interface 518 provides a two-way data communication coupling to a network link 520 that is connected to a local network 522. Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of buffering data, the method comprising the steps of:
   receiving a request to access data that presently resides in a first buffer, wherein said first buffer is a member of an ordered set of buffers; and
   in response to receiving said request, performing the following steps of:
      determining a profit value associated with said first buffer, said profit value reflecting a plurality of access characteristics; and
      establishing a position for said first buffer in said ordered set based on said profit value.

2. The method of claim 1, wherein said ordered set has a top and a bottom, said top being associated with a highest profit and said bottom being associated with a lowest profit, wherein the step of establishing a position for said first buffer includes establishing a new position for said buffer closer to the bottom.

3. The method of claim 1, wherein said ordered set has a top and a bottom, said top being associated with a highest profit and said bottom being associated with a lowest profit, wherein said first buffer is associated with a current position, wherein a second buffer is at a second position that is higher than said current position of said first buffer, and wherein the step of establishing a position for said first buffer includes establishing a new position that is above said current position but lower than said second position.

4. The method of claim 1, wherein said ordered set has a top and a bottom, said top being associated with a highest profit and said bottom being associated with a lowest profit, wherein said first buffer is associated with a current position that is not at the top of said ordered set, and wherein the step of establishing a position for said first buffer includes retaining said current position of said first buffer.

5. The method of claim 1, wherein the step of determining a profit value associated with said first buffer includes generating a profit value based on:
   frequency of use of said first buffer, and recency of use of said first buffer.

6. The method of claim 1, wherein the step of determining a profit value associated with said first buffer includes generating a profit value based on tenure of the data in said first buffer.

7. The method of claim 1, wherein:
   the method further includes the step of establishing a set of accesses, wherein said set of accesses is a subset of all accesses to data currently stored in said ordered set of buffers; and
   the step of determining a profit value associated with said first buffer includes generating a profit value based on what portion of said set of accesses are to said first buffer.

8. The method of claim 1, wherein:
   the method further includes the step of establishing three or more mutually exclusive profit ranges that are each associated with a range of positions within said ordered set;
   said first buffer is associated with a first profit range; and
   the step of establishing a position for said first buffer includes:
      determining whether said profit value falls within said first profit range, and
      if said profit value does not fall within said first profit range, then assigning said buffer to a position associated with another profit range that corresponds to said profit value.

9. The method of claim 1,
   wherein said first buffer is associated with only one position in said ordered set before receiving said request; and
   wherein the step of establishing a position for said first buffer in said ordered set includes changing the only one position associated with said first buffer based on said profit value.

10. A method of buffering data, the method comprising the steps of:
    receiving a request to access data that presently resides in a particular buffer, wherein said particular buffer is member of an ordered set of buffers that are each associated with a position within said ordered set, wherein a first buffer is associated with a first position within said ordered set and a second buffer is associated with a second position within said ordered set; and
    in response to receiving said request, performing the following steps of:
       determining a profit value associated with said particular buffer; and
       establishing a different position for said particular buffer relative to other members of said ordered set based on said profit value, said position being below said first position but above said second position.

11. The method of claim 10, wherein the method further includes the steps of:
    establishing three or more mutually exclusive profit ranges that are each associated with a range of positions within said ordered set;
    wherein said particular buffer is currently associated with a current position within said ordered set that belongs to a particular profit range;
    determining whether said profit value falls within said particular profit range; and
    if said profit value falls within said particular profit range, then retaining said current position for said particular buffer.

12. A method of buffering data that resides in an ordered set of buffers, the method comprising the steps of:
    establishing three or more mutually exclusive profit ranges that are each associated with a range of positions within said ordered set;
    receiving a request to access data that presently resides in a first buffer from said ordered set; and
    in response to receiving said request, performing the following steps of:
       determining a profit value associated with said first buffer;
       determining which profit range is associated with said profit value; and
       establishing for said first buffer a new position within said ordered set that is associated with the profit range corresponding to said profit value.

13. A method of buffering data, the method comprising the steps of:
    receiving a request to access data that presently resides in a first buffer, wherein said first buffer is a member of an ordered set of buffers that are each associated with a position;
    establishing a current position for said first buffer within a range of positions within said ordered set of buffers;
    adding other buffers to positions ahead of said first buffer;
    accessing said first buffer; and in response to accessing said first buffer, performing the following steps of:
  determining whether the current position of said first buffer falls within said range;
  if the current position of said first buffer falls within said range, then retaining said current position for said first buffer; and
  if the current position of said first buffer does not fall within said range, then establishing a new position for said first buffer based on a profit value associated with said first buffer.

14. The method of claim 13, including the steps of:
receiving a request for other data;
adding said other data to said first buffer; and
establishing a position for said first buffer below said range.

15. A computer-readable medium carrying one or more sequences of one or more instructions for buffering data, wherein the execution of the one or more sequences of the one or more instructions by one or more processors, causes the one or more processors to perform the steps of:
  receiving a request to access data that presently resides in a first buffer, wherein said first buffer is a member of an ordered set of buffers; and
  in response to receiving said request, performing the following steps of:
    determining a profit value associated with said first buffer, said profit value reflecting a plurality of access characteristics; and
    establishing a position for said first buffer in said ordered set based on said profit value.

16. The computer-readable medium of claim 15, wherein said ordered set has a top and a bottom, said top being associated with a highest profit and said bottom being associated with a lowest profit, wherein the step of establishing a position for said first buffer includes establishing a new position for said buffer closer to the bottom.

17. The computer-readable medium of claim 15, wherein said ordered set has a top and a bottom, said top being associated with a highest profit and said bottom being associated with a lowest profit, wherein said first buffer is associated with a current position, wherein a second buffer is at a second position that is higher than said current position of said first buffer, and wherein the step of establishing a position for said first buffer includes establishing a new position that is above said current position but lower than said second position.

18. The computer-readable medium of claim 15, wherein said ordered set has a top and a bottom, said top being associated with a highest profit and said bottom being associated with a lowest profit, wherein said first buffer is associated with a current position that is not at the top of said ordered set, and wherein the step of establishing a position for said first buffer includes retaining said current position of said first buffer.

19. The computer-readable medium of claim 15, wherein the step of determining a profit value associated with said first buffer includes generating a profit value based on:
  frequency of use of said first buffer, and recency of use of said first buffer.

20. The computer-readable media of claim 14,
herein said first buffer is associated with only one position in said ordered set before receiving said request; and
wherein the step of establishing a position for said first buffer in said ordered set includes changing the only one position associated with said first buffer based on said profit value.

21. A computer-readable medium carrying one or more sequences of one or more instructions for buffering data that resides in an ordered set of buffers, wherein the execution of the one or more sequences of the one or more instructions by one or more processors, causes the one or more processors to perform the steps of:
  establishing three or more mutually exclusive profit ranges that are each associated with a range of positions within said ordered set;
  receiving a request to access data that presently resides in a first buffer from said ordered set; and
  in response to receiving said request, performing the following steps of:
    determining a profit value associated with said first buffer;
    determining which profit range is associated with said profit value; and
    establishing for said first buffer a new position within said ordered set that is associated with the profit range corresponding to said profit value.

22. A computer-readable medium carrying one or more sequences of one or more instructions for buffering data, wherein the execution of the one or more sequences of the one or more instructions by one or more processors, causes the one or more processors to perform the steps of:
  receiving a request to access data that presently resides in a first buffer, wherein said first buffer is a member of an ordered set of buffers that are each associated with a position;
  establishing a current position for said first buffer within a range of positions within said ordered set of buffers;
  adding other buffers to positions ahead of said first buffer;
  accessing said first buffer; and
  in response to accessing said first buffer, performing the following steps of:
    determining whether the current position of said first buffer falls within said range;
    if the current position of said first buffer falls within said range, then retaining said current position for said first buffer; and
    if the current position of said first buffer does not fall within said range, then establishing a new position for said first buffer based on a profit value associated with said first buffer.

23. A computer-readable medium carrying one or more sequences of one or more instructions for buffering data, wherein the execution of the one or more sequences of the one or more instructions by one or more processors, causes the one or more processors to perform the steps of:
  receiving a request to access data that presently resides in a particular buffer, wherein said particular buffer is member of an ordered set of buffers that are each associated with a position within said ordered set, wherein a first buffer is associated with a first position within said ordered set and a second buffer is associated with a second position within said ordered set; and
  in response to receiving said request, performing the following steps of:
    determining a profit value associated with said particular buffer; and establishing a different position for said particular buffer relative to other members of said ordered set based on said profit value, said position being below said first position but above said second position.

24. The computer-readable medium of claim 23, wherein the steps further include:

establishing three or more mutually exclusive profit ranges that are each associated with a range of positions within said ordered set;

wherein said particular buffer is currently associated with a current position within said ordered set that belongs to a particular profit range;

determining whether said profit value falls within said particular profit range; and if said profit value falls within said particular profit range, then retaining said current position for said particular buffer.

\* \* \* \* \*